United States Patent [19]

Charles et al.

[11] 4,162,549
[45] Jul. 31, 1979

[54] FILTERING ELEMENTS

[75] Inventors: Paul A. S. Charles, Rockford, Ill.; Frederic D. M. Williams, Mississauga, Canada

[73] Assignee: Royal Flush (1979) Inc., Hamilton, Canada

[21] Appl. No.: 866,629

[22] Filed: Jan. 3, 1978

[51] Int. Cl.² .................. E03D 5/01; B01D 35/02
[52] U.S. Cl. ......................................... 4/318; 4/317; 4/420; 210/411; 210/416 F; 210/497.1; 417/395; 417/540
[58] Field of Search ............ 210/411, 416, 430, 497.1; 4/318, 431–433, 317, 420; 417/395, 540, 542, 544

[56] References Cited

U.S. PATENT DOCUMENTS

| | | | |
|---|---|---|---|
| 2,464,196 | 3/1949 | Van Ranst | 210/416 F |
| 2,735,366 | 2/1956 | Hunter | 210/416 R |
| 3,228,036 | 1/1966 | Zaske et al. | 4/433 X |
| 3,294,030 | 12/1966 | Fox | 417/395 X |
| 3,912,423 | 10/1975 | Pfabe | 210/416 F |

Primary Examiner—William A. Cuchlinski, Jr.
Attorney, Agent, or Firm—Hirons, Rogers & Scott

[57] ABSTRACT

A back-washable filtering element, especially for use with pumps, and more particularly for use with pumps that handle liquids with solid material entrained therein, consists of a helical coil spring disposed in a flow path for the liquid to be filtered. A movable element in the flow path is mechanically connected to the spring and compresses it axially under the effect of the back washing liquid to automatically reduce the flow capacity. The resultant "shrugging" of the spring also permits it to clear itself of filtered material to facilitate the back-washing.

9 Claims, 4 Drawing Figures

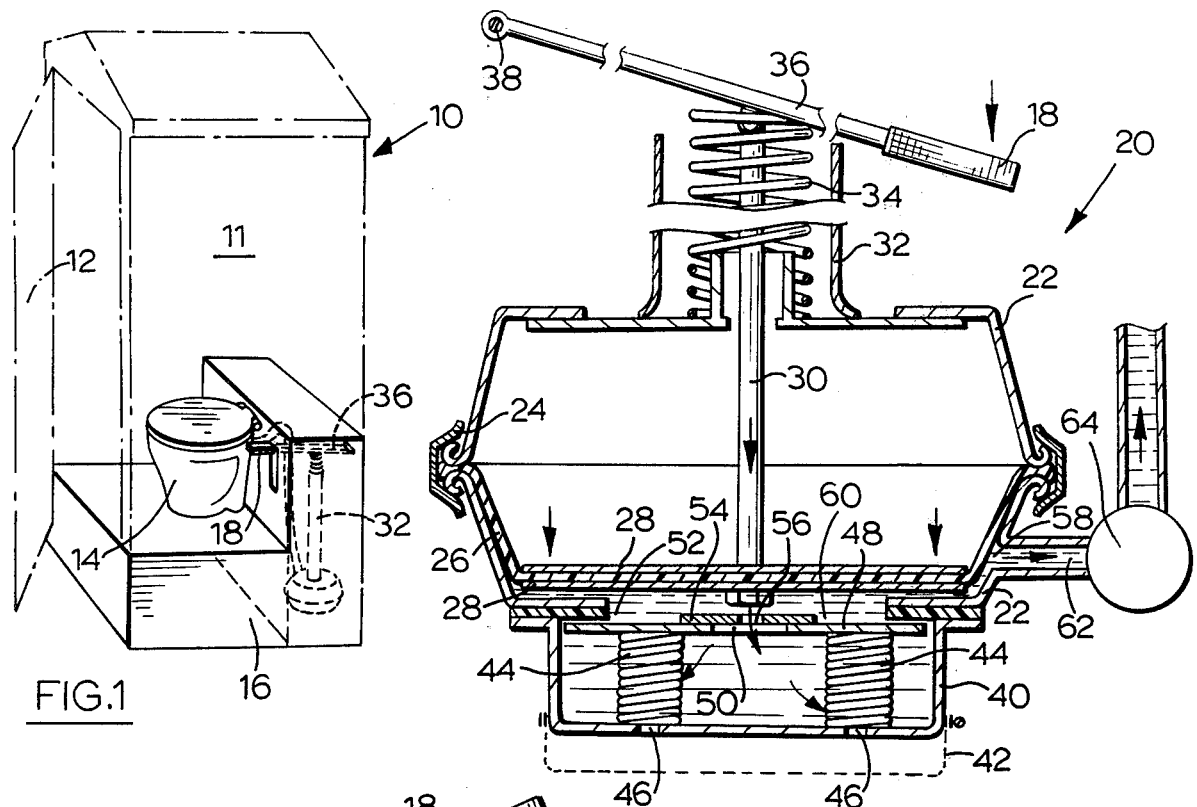
FIG.1
FIG.3
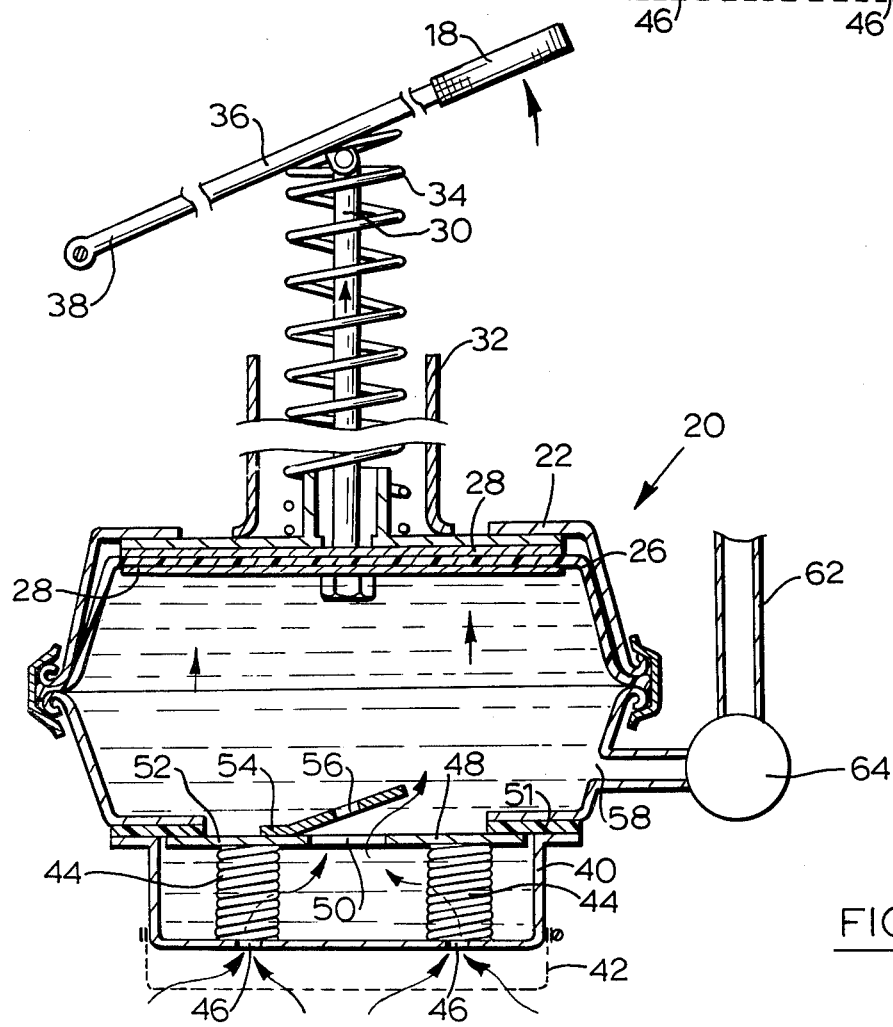
FIG.2

FILTERING ELEMENTS

FIELD OF THE INVENTION

The present invention is concerned with improvements in or relating to filtering elements and especially, but not exclusively, to such elements for use in association with pumps.

REVIEW OF THE PRIOR ART

The art of the filtration of liquids is of course large and well-established, and numerous arrangements have been proposed hitherto for "back-washing" filter elements to prevent rapid clogging by the filtered material. A very specific example of the need for such a filter element is in combination with a flushing pump employed in a self-contained portable toilet of the kind in which the flushing liquid is re-circulated. The pump will usually be of the diaphragm type, owing to the abilities of this type of pump in handling liquids with entrained solid material, and the majority of the solid material in the reservoir of flushing liquid will remain at the bottom thereof. Filtration of the re-circulated liquid is essential to remove fine solid material therefrom. In this particular application the most difficult material to deal with is the finely divided pieces of disintegrated toilet paper which quickly accumulates in the reservoir, this material having a marked ability to agglomate together on a filter, being sufficiently adherent to itself and the filter to make back-washing difficult.

DEFINITION OF THE INVENTION

It is an object of the invention to provide a new form of filter element. It is a more specific object to provide a new form of filter element which will automatically control the amount of back-washing therethrough that can be achieved.

In accordance with the invention there is provided a new filter element comprising means establishing a flow path having an inlet and an outlet, a coil spring filter element disposed in the flow path for liquid passing from the inlet to the outlet to pass through the coils thereof to be filtered, a member in the flow path movable by reverse movement of liquid in the path from the outlet toward the inlet, the movable member being mechanically connected to the coil spring filter element and compressing it axially upon said movement to reduce the flow capacity through the coils thereof during the said reverse liquid flow backwashing through the filter element.

DESCRIPTION OF THE DRAWINGS

A specific preferred embodiment of the invention will now be described, by way of example, with reference to the accompanying diagrammatic drawings, wherein:

FIG. 1 is a general perspective view of a self-contained portable toilet in which a filter element of the invention is employed in combination with a diaphragm-type flushing pump, FIGS. 2 and 3 are axial cross-sections through the pump and filter element combination showing it respectively at the ends of a suction and a pressure stroke.

DESCRIPTION OF THE PREFERRED EMBODIMENTS

Figure 4:
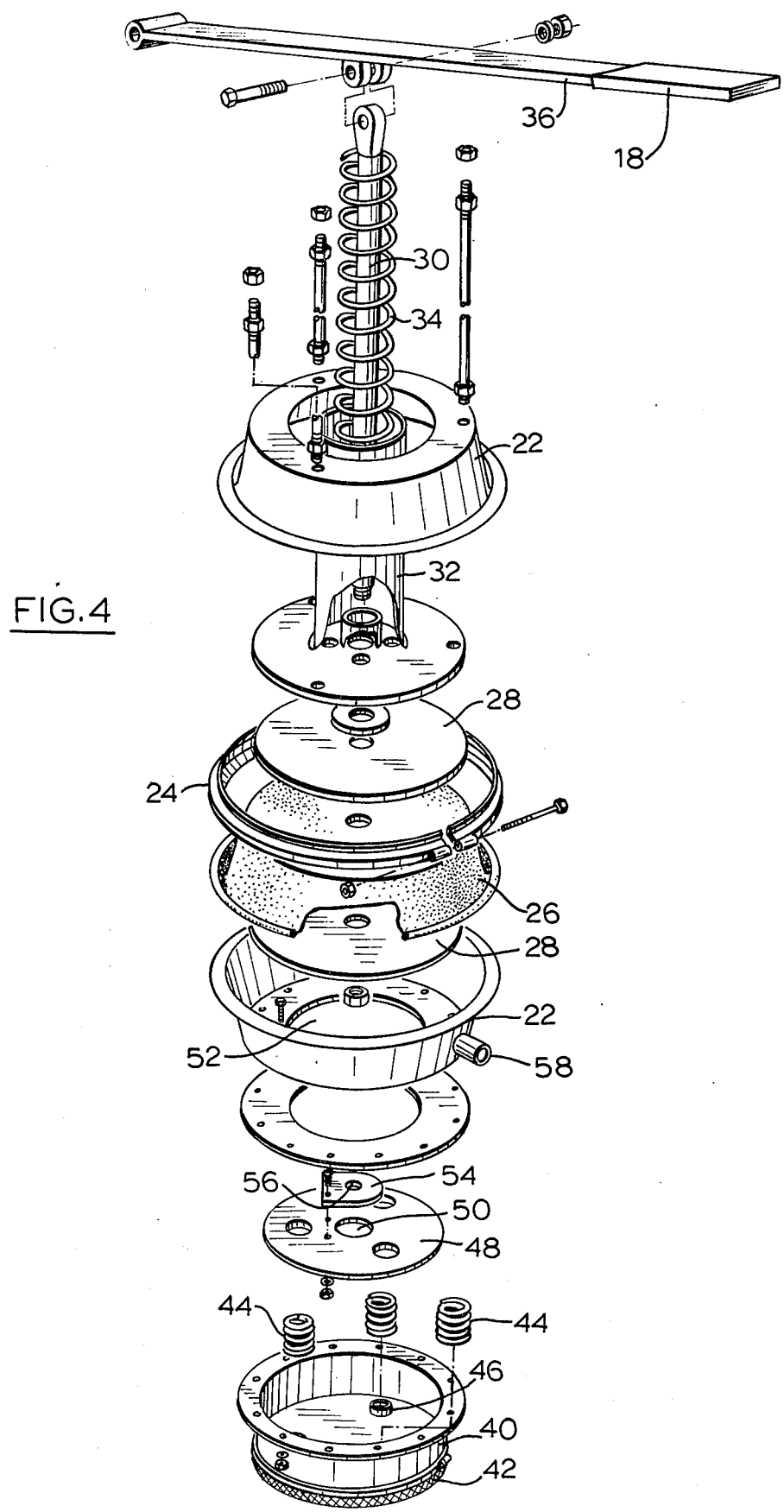
FIG. 4 is an axially exploded view through the pump and filter element combination.

The self-contained portable toilet in which the pump/filter combination is employed is indicated generally by the reference 10 and consists of a cabinet 11 having a front door 12 and enclosing a toilet seat 14 mounted adjacent a liquid reservoir 16 and discharging therein. A foot pedal 18 extends out of the toilet seat structure to one side thereof, and is depressed by the user to actuate the pump/filter unit 20 and flush the toilet with liquid withdrawn from the reservoir 16.

The unit 20 consists of two dish-shaped casing parts 22 clamped together at their circular edges by a ring 24, a circular flexible diaphragm 26 being thereby clamped securely between them to act as a pump diaphragm. The centre part of the diaphragm is clamped between two circular metal plates 28, which connect the diaphragm to an operating rod 30 passing upwards through a sleeve 32 fixed to the upper casing part 22. A compression spring 34 is operative between the upper casing part 22 and an arm 36 pivoted at 38 to the toilet structure, the foot pedal 18 being fastened to the free end of the arm 36. The spring 34 urges the foot pedal upwards against the downward force of the operator's foot and returns it to its upper-most position upon completion of a downward stroke.

A dish-shaped member 40 is fastened to the bottom of the lower pump part 22, and a dish-shaped filter mesh member 42 is fastened to the bottom of the dish-shaped member 40. Three filter element coil springs 44 are mounted on the flat inner bottom surface of the member 40, so that they each stand over a respective inlet aperture 46. A circular metal plate 48 having a central aperture 50 therein is fastened to the upper ends of all of the springs 42 and is urged upwardly thereby. The circular outer edge of the plate 48 is pressed by the springs against a resilient annular ring 51 fastened around the circumference of a corresponding aperture 52 in the flat bottom of the lower pump element 22. The aperture 50 is covered by a flap valve 54 fastened to the upper surface of the plate 48, the valve having a small aperture 56 therein. An outlet 58 from the interior of the pump chamber 60 feeds the pumped liquid via pipes 62 and a check valve 64 to the toilet.

The operation of the pump/filter unit 20 will now be described commencing with the diaphragm 16 in its normal upper-most position, as seen in FIG. 2, to which it has been moved by the return spring 34. Upon depression of the foot pedal 18 liquid is forced out of the chamber 60 through the check valve 64 to the toilet, from whence it returns by gravity to the interior of the reservoir 16. A small amount of liquid also escapes from the chamber 60 via the flap valve aperture 56 to increase the quantity thereof available for back-washing of the coil spring filter elements 44. Upon release of the pedal 18 liquid from the reservoir is drawn into the pump chamber 60 through filter mesh 42, apertures 46, filter elements 44 and flap valve 54, which opens in this direction of flow.

It will be seen that liquid moving in the flow path between the inlets 46 and the pump outlet 58 must pass through the coils of the springs to be filtered thereby, the spacing between the coils being an order of magnitude smaller than that of the mesh 42 (e.g. about 0.01 inch or 0.025 cm. for the springs as compared to 0.06 inch or 0.15 cm. for the mesh). The plate 48 is also disposed in this flow path and is pressed by the forward flow of liquid from inlet to outlet into contact with the ring 51 as seen in FIG. 2. However, the reverse flow of liquid as the diaphragm descends, as seen in FIG. 3, will move the plate 48 downwards, and this movement is transmitted directly to the springs 44 to close the spacing between their turns, thereby reducing the flow capacity therethrough during the backwashing phase, which is effected by liquid passing around the disc 48 and through the valve aperture 56. This reduced backflow of liquid will clean solid material from the interiors of the springs and return it through the mesh 42 to the reservoir. The rate of the springs 44 is determined so that the axial force applied thereto by the plate 48 will produce the desired reduction in backwash flow capacity.

It is found that the backwashing obtained with a coil spring filter unit of the invention is even more effective than was anticipated. It is at present believed that this effective operation may be due to the fact that the springs tend to oscillate under the force that is applied to them by the plate, giving a "shrugging" effect as the backwash water flows through that facilitates the dislodging of the retained material.

The number of spring filter elements 44 employed will be determined by persons skilled in the art from calculations based on the flow rate, the size of filtering apertures required, and the spring rate required to obtain the required action during backwashing. In the specific embodiment described three were employed, but in other embodiments any number from one upwards may be used.

The use of a coil spring as a filter element in association with a pump or equivalent source of liquid under pressure has advantages, in that the spring provides inexpensively a sturdy element having a filtering aperture in the form of an accurately-dimensioned elongated slot. Such a slot can in practice be of very small dimensions for fine filtering and can be wound with fine tolerance of fine tolerance material to give the necessary accuracy. One or more such elements can be disposed in a flow passage, preferably at the pump inlet as illustrated, or alternatively at the pump outlet.

We claim:

1. A filter element comprising means establishing a flow path having an inlet and an outlet, a coil spring filter element disposed in the flow path for liquid passing from the inlet to the outlet to pass through the coils thereof to be filtered, a member in the flow path movable by reverse movement of liquid in the path from the outlet toward the inlet, the movable member being mechanically connected to the coil spring filter element and compressing it axially upon said movement to reduce the flow capacity through the coils thereof during the said reverse liquid flow backwashing through the filter element.

2. A filter element as claimed in claim 1, and comprising a plurality of coil spring filter elements mechanically connected to and compressed axially by a common movable member.

3. A filter element as claimed in claim 1, in combination with a pump, wherein the said flow path is provided at the inlet to the pump.

4. A filter element as claimed in claim 1, in combination with a pump having a pump chamber into which liquid is drawn and from which the liquid subsequently is discharged, wherein the said movable member is part of a wall of the said pump chamber.

5. A filter element as claimed in claim 4, wherein the movable member is a movable plate carrying an entry valve for liquid to the said pump chamber.

6. A filter element as claimed in claim 5, wherein the said entry valve permits a limited back-flow of liquid therethrough during discharge from the pump chamber for backwashing of the filter element.

7. A filter element as claimed in claim 4, wherein the said pump is of diaphragm type having a diaphragm clamped between two body members, and the said movable member is part of the wall of one of the said body members.

8. A filter element as claimed in claim 7, wherein the pump includes a dish-shaped body member mounted by the body member carrying the movable member, the dish-shaped body member mounting the filter element therein between itself and the movable member.

9. A filter element as claimed in claim 3, in combination with a toilet and a reservoir into which the toilet discharges, wherein the pump is disposed in the toilet and is operated to extract liquid from the reservoir and to supply it to the toilet.

* * * * *